(12) United States Patent
Min-Liang et al.

(10) Patent No.: US 8,692,771 B2
(45) Date of Patent: Apr. 8, 2014

(54) MODULAR COMPUTER MOUSE

(76) Inventors: Tan Min-Liang, Singapore (SG); Ng Chern Ann, Singapore (SG)

( * ) Notice: Subject to any disclaimer, the term of this patent is extended or adjusted under 35 U.S.C. 154(b) by 318 days.

(21) Appl. No.: 11/883,913

(22) PCT Filed: Mar. 30, 2006

(86) PCT No.: PCT/US2006/011878
§ 371 (c)(1),
(2), (4) Date: Oct. 25, 2010

(87) PCT Pub. No.: WO2007/114807
PCT Pub. Date: Oct. 11, 2007

(65) Prior Publication Data
US 2011/0063219 A1  Mar. 17, 2011

(51) Int. Cl.
*G06F 3/033* (2013.01)

(52) U.S. Cl.
USPC .......................................... 345/163; 345/156

(58) Field of Classification Search
USPC ................................................ 345/156–184
See application file for complete search history.

(56) References Cited

U.S. PATENT DOCUMENTS

| | | | | |
|---|---|---|---|---|
| 4,906,843 A * | 3/1990 | Jones et al. | | 250/221 |
| 5,245,146 A * | 9/1993 | Florence | | 200/333 |
| 5,990,870 A * | 11/1999 | Chen et al. | | 345/163 |
| 6,031,522 A * | 2/2000 | Strand | | 345/163 |
| 6,072,471 A * | 6/2000 | Lo | | 345/163 |
| 6,200,219 B1 * | 3/2001 | Rudell et al. | | 463/37 |
| 6,362,811 B1 * | 3/2002 | Edwards et al. | | 345/163 |
| 6,373,468 B1 * | 4/2002 | Leman | | 345/163 |
| 6,411,281 B1 * | 6/2002 | Sasselli et al. | | 345/163 |
| 6,509,891 B1 * | 1/2003 | Sheehan et al. | | 345/167 |
| 6,525,306 B1 * | 2/2003 | Bohn | | 250/221 |
| 6,567,073 B1 * | 5/2003 | Levin | | 345/163 |
| 6,590,563 B1 * | 7/2003 | Oross et al. | | 345/163 |
| 6,704,003 B2 * | 3/2004 | Tiphane et al. | | 345/163 |
| 7,304,636 B2 * | 12/2007 | Willat et al. | | 345/163 |
| 7,576,729 B2 * | 8/2009 | Medina | | 345/158 |
| 7,609,251 B2 * | 10/2009 | Rogers | | 345/163 |
| 7,710,397 B2 * | 5/2010 | Krah et al. | | 345/163 |
| 7,755,609 B2 * | 7/2010 | Segalle | | 345/163 |
| 7,924,266 B2 * | 4/2011 | Larsen | | 345/163 |
| 8,009,138 B2 * | 8/2011 | Yasutake | | 345/156 |
| 2002/0105500 A1 * | 8/2002 | Edwards et al. | | 345/163 |
| 2002/0109672 A1 * | 8/2002 | Kehlstadt et al. | | 345/157 |
| 2002/0118174 A1 * | 8/2002 | Rodgers | | 345/163 |
| 2002/0126092 A1 * | 9/2002 | Tiphane et al. | | 345/163 |

(Continued)

FOREIGN PATENT DOCUMENTS

EP       757327 A2 *  2/1997  ............ G06K 11/18

*Primary Examiner* — Dmitriy Bolotin
(74) *Attorney, Agent, or Firm* — Andrew G. DiNovo; DiNovo Price Ellwanger & Hardy LLP

(57) ABSTRACT

A system and method are disclosed for providing a modular user input device such as a computer mouse. A core module can house the sensor, microcontroller and RF modules (if any). It may or may not also house the microswitches and scroll wheel. The core module includes a case module connector that will allow it to accept mouse button inputs from an interchangeable case module, power from a battery pack (if required for wireless operation) and control lights or any other input/output features on the mouse itself. The core module can also accept the connection to the host computer, either through the case module connector or directly via USB or similar industry standard connector.

14 Claims, 4 Drawing Sheets

Interchangeable Thumb Grooves

(56) References Cited

U.S. PATENT DOCUMENTS

| | | | |
|---|---|---|---|
| 2003/0160764 A1* | 8/2003 | Kuan | 345/163 |
| 2005/0007345 A1* | 1/2005 | Kuan | 345/163 |
| 2005/0083302 A1* | 4/2005 | Chen | 345/163 |
| 2005/0146501 A1* | 7/2005 | Chen | 345/163 |
| 2006/0007145 A1* | 1/2006 | Naghi et al. | 345/163 |
| 2006/0007151 A1* | 1/2006 | Ram | 345/163 |
| 2006/0044270 A1* | 3/2006 | Chen | 345/163 |
| 2007/0046631 A1* | 3/2007 | Chang | 345/163 |
| 2007/0252816 A1* | 11/2007 | Yen | 345/163 |
| 2008/0246727 A1* | 10/2008 | Larsen | 345/163 |
| 2009/0153476 A1* | 6/2009 | Kang | 345/157 |
| 2010/0231514 A1* | 9/2010 | Min-Liang et al. | 345/163 |
| 2011/0205158 A1* | 8/2011 | Hsu | 345/164 |

* cited by examiner

MODULAR COMPUTER MOUSE

FIELD OF THE INVENTION

The present invention relates generally to the field of computer peripherals, and more particularly to user input devices such as the computer mouse.

BACKGROUND OF THE INVENTION

Currently, most computer mice have optical/laser based sensors. Older or more conventional units feature mechanical type balls. All of these interpret a user's movement and send associated signals to a host device. Mice also comprise one or more buttons and potentially other input controls such as scroll wheels/tilt wheels and programmable buttons to accept user input. The mouse may be directly connected to the host computer via a wire or wirelessly through radio, I/R or some other method. Typically, the most expensive components in a mouse are the microcontroller, the optical/laser sensor and the wireless transmission component (if any).

A user typically must select from several pre-determined shapes provided by the mouse manufacturer.

This necessitates most manufacturers making several mice to suit the requirements of various users, even though each mouse with different shapes may have common internal components (i.e., the microcontroller, sensor and wireless component).

In order to provide users with different ergonomic designs and functionality while sharing the common internal components, existing approaches include:

1. "Mini mouse" —A very small mouse, which accepts larger cases on top. The limitation of this is that there is not much flexibility, the additional cases merely ride piggy back and the larger mouse buttons simply actuate the existing "Mini mouse" button. This tends to lead to mechanical inaccuracy and requires parts to be manufactured to extremely high tolerances, which may not be cost effective.
2. "Multi-case mouse" —This design has either multiple top covers meant to fit onto one existing bottom cover, or the internal PCB is designed to be unscrewed from one case and screwed into another case. The disadvantage here is that in a multiple button and scroll wheel positions of the bottom cover. There is also some danger since the internal circuitry is not shielded from the lay user who may accidentally damage it when changing cases.

SUMMARY OF THE INVENTION

An improved user input device is disclosed having modular system wherein the most expensive components may be collected in a core module. This core module can house the sensor, microcontroller and RF modules, if any. It may also house the microswitches and scroll wheel that can be actuated when using the external case.

A specially adapted connector is utilized to allow the core module to accept mouse button inputs from an interchangeable case, power from a battery pack (if required for wireless operation) and control lights or any other input/output features on the mouse itself.

The core module can also accept the connection to the host computer, either through the module connector or directly via USB or similar industry standard connector.

A person of skill in the art will appreciate that while the specification discusses the present invention in the context of the computer mouse, other computer input devices, including joysticks, game pads, and the like, can also benefit from the modular approach described herein.

The above summary of the present invention is not intended to represent each embodiment, or every aspect, of the present invention. The detailed description and figures will describe many of the embodiments and aspects of the present invention.

BRIEF DESCRIPTION OF THE DRAWINGS

The foregoing and other advantages of the invention will become apparent upon reading the following detailed description and upon reference to the drawings, wherein.

Figure 1:
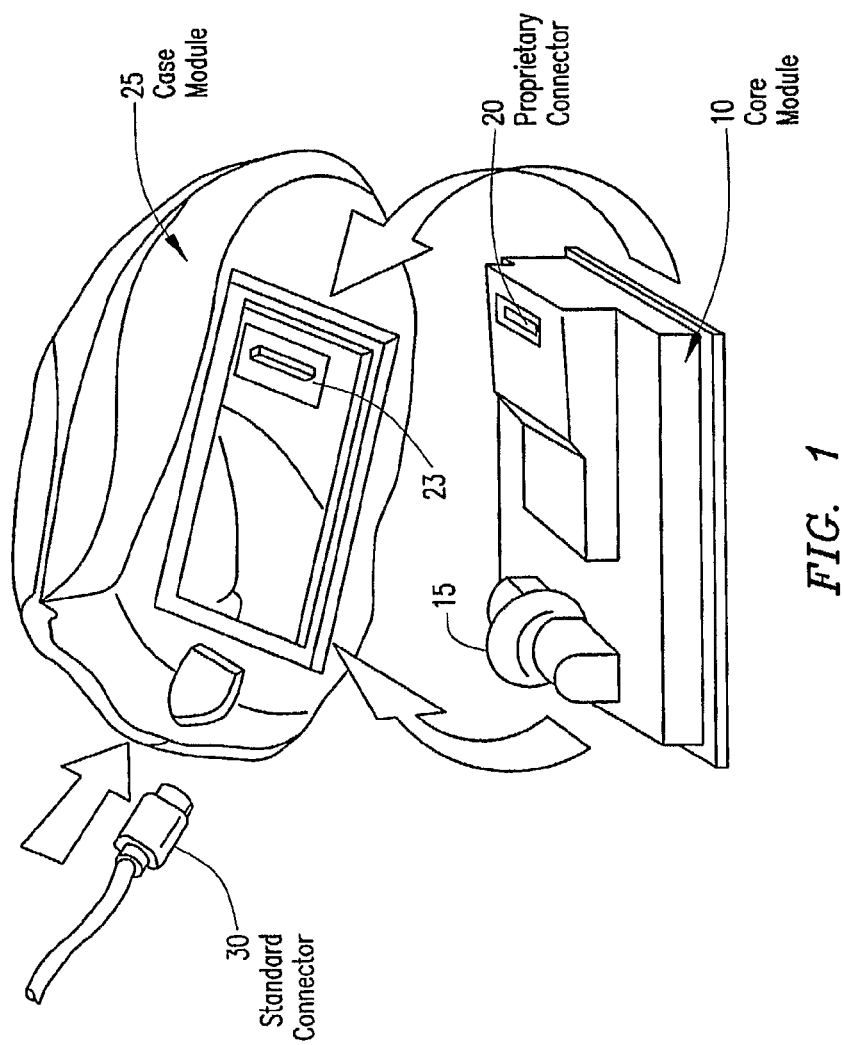
FIG. 1 illustrates a perspective view of a detached core module and case module.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF PREFERRED EMBODIMENTS

As summarized above, embodiments of the invention provide a computer input device such as a mouse having a modular capability.

Referring to FIG. 1, a "core module" 10 houses the sensor, microcontroller and RF modules, if any (interior circuitry not shown). It may or may not also house the microswitches and scroll wheel 15 that can be actuated upon assembly with a case module.

In a preferred embodiment, the unit comprises a case module connector 20 that will allow it to accept mouse button inputs from an interchangeable case (a "case module") 25, power from a battery pack (if required for wireless operation) and control lights or any other input/output features on the mouse itself.

The core module also 10 accepts the connection to the host computer, either through the case module connector 20 or directly via USB or similar industry standard connector 30.

Figure 2:
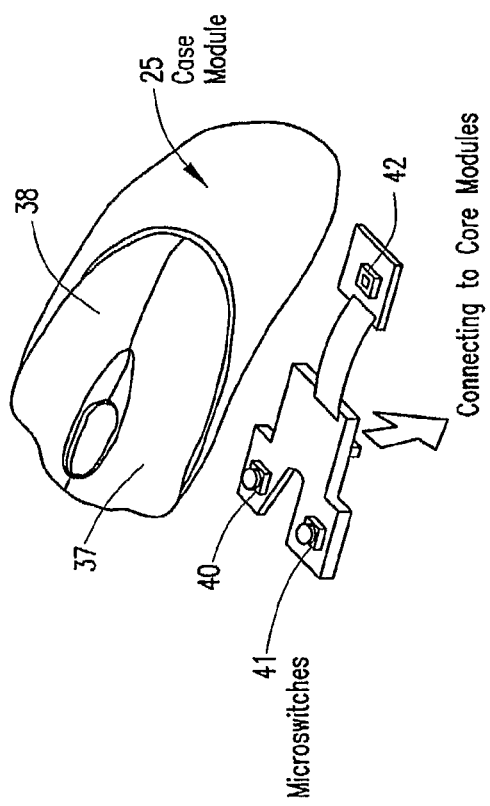
FIG. 2 illustrates a top-down view of a case module and a cutaway view of the case module showing switches and the core module connector.

Referring now to FIG. 2, the case module 25 share comprises a core module connector 23 that will allow them to interface with an appropriately designed core module having a corresponding case module connector. Case module 25 may have a differing number of buttons 37, 38, and may include the microswitches 40, 41, 42 in the case itself. Case modules may also have battery packs in order to power wireless versions of core modules.

Figure 3:
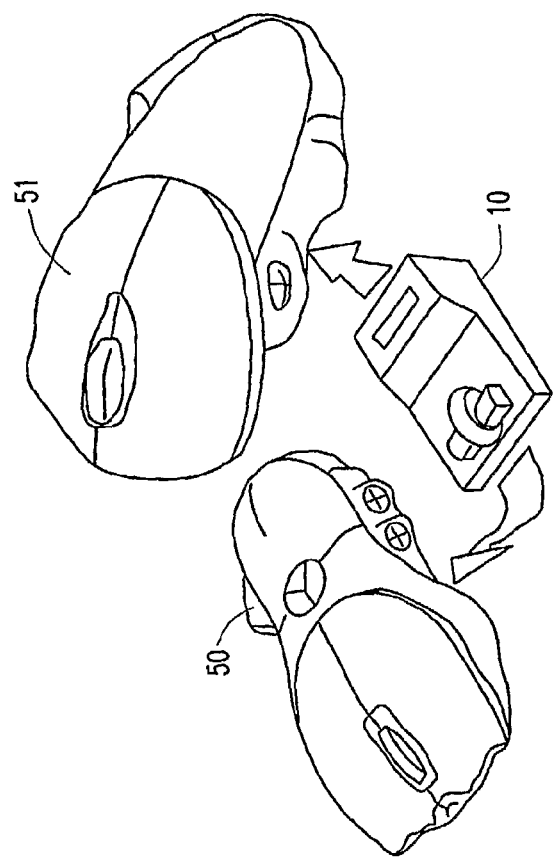
FIG. 3 illustrates a swapping of case modules in accordance with one aspect of the present invention.

FIG. 3 depicts an exchange of case modules 50, 51 for core module 10. As the different case modules 50, 51 are mated with core module 10, the user need not be exposed to the internal circuitry of the mouse. This modular system allows for great flexibility in the cases (e.g. batteries, lights, numbers of buttons, ergonomic shape) without exposing the lay end user to sensitive components in the mouse itself.

This invention enables thus users to use a single core module, and then mix and match with inexpensive case modules to suit their individual preferences, or for a user to use the same case module with a wired or wireless core module (e.g., keeping the same familiar shape and using one or the other depending on prevailing user requirements).

Figure 4:
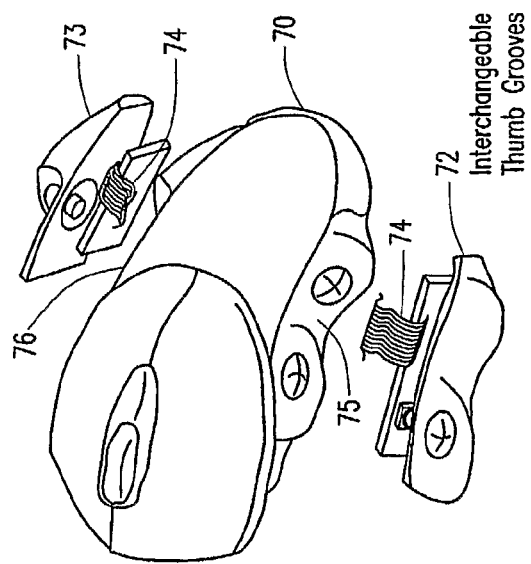
FIG. 4 depicts an alternative embodiment of a computer mouse case having selectively detachable thumb grooves.

In an alternative embodiment shown in FIG. 4, the case module 70 is modifiable to allow for left or right-handed use. An otherwise conventional case can be adapted to allow interchangeable thumb grooves 72, 73 and buttons on the right and left side of the mouse. Thumb grooves 72, 73 may be mechanically inserted into corresponding slots 75, 76.

In this way, the mouse may be converted from a right handed to left handed mouse by changing the thumb groove. The thumb groove area may have buttons that are connected to the mouse (or case module) via a small cable 74, so that when right or left thumb grooves are used, the corresponding buttons are also shifted from right to left.

An advantage of the preceding embodiment describing the thumb groove approach instead of swapping the entire mouse case is that if a modular system is not used, it is still possible for a user to customize a mouse from right handed to left handed versions easily at a relatively low cost.

Note that the above descriptions can be beneficially applied to other user input devices such as trackballs, game pads and the like.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A computer mouse, adapted for providing a plurality of user-customizable configurations, comprising:
    a core module comprising:
        a sensor:
        a microcontroller; and
        a case module connector;
    a case module comprising:
        an exterior case having a right side and a left side, wherein said exterior case further comprises a left side mechanical connector and a right side mechanical connector:
        a button module having at least one button, the button module flexibly connected to the case module, and moveable between said right side and said left side of the exterior case; and
        a core module connector configured for detachable mating engagement with said case module connector of said core module:
    a left hand thumb groove for detachable mating engagement with said left side mechanical connector for right hand use: and
    a right hand thumb groove for detachable mating engagement with said right side mechanical connector for left hand use:
    wherein said left hand thumb groove and said right hand thumb groove are distinct in shape and each forms a portion of said left side and said right side of the exterior case when in mating engagement with the respective mechanical connectors:
    wherein the left hand thumb groove is engageable with the left side mechanical connector when the button module intermediates therebetween, such that the at least one button is actuatable by said right hand use;
    wherein the right hand thumb groove is engageable with the right side mechanical connector when the button module intermediates therebetween, such that the at least one button is actuatable by said left hand use;
    wherein mounting of said case module onto said core module enables detachable mating engagement of said case module connector and said core module connector and enables an electrical coupling therefrom for signal transfer between said case module connector and said core module connector,
    wherein mating engagement of said left hand thumb groove with said left side mechanical connector and mating engagement of said right hand thumb groove with said right side mechanical connector enables signal transfer of a user input on the at least one button of the button module to said core module; and
    wherein said core module, said case module, said button module, said left hand thumb groove and said right hand thumb groove enable a plurality of user-customizable mouse configurations.

2. The computer mouse of claim 1 wherein said right side mechanical connector and said left side mechanical connector comprise pockets formed in said right side and said left side of said exterior case.

3. The computer mouse or claim 1, wherein said right side mechanical connector and said left side mechanical connector comprise clips mounted on said right side and said left side of said exterior case.

4. The computer mouse of claim 1, wherein said core module further comprises microswitches.

5. The computer mouse of claim 1, wherein said core module further comprises a scroll wheel.

6. The computer mouse of claim 1, wherein said case module further comprises a battery pack, at least one mouse button to receive inputs from a user, and a light feature configured to emit light.

7. The computer mouse of claim 1, wherein said battery pack is modular and replaceable by a user.

8. The computer mouse of claim 7, wherein said connection is USB compliant.

9. The computer mouse of claim 1, wherein said core module further comprises a connection for communication to a computer.

10. The computer mouse of claim 9, wherein said case module connector is configured to accept mouse button inputs from said case module through said core module connector.

11. The computer mouse of claim 9, wherein said connection for communication to the computer is provided through said case module connector.

12. The computer mouse of claim 9, wherein said connection for communication to the computer is a wireless connection.

13. The computer mouse of claim 1, wherein said case module connector is configured to enable said core module to interchangeably couple to a first case module and a second case module and wherein said first case module differs from said second case module in one of a computer mouse input feature and a computer mouse output feature and an ergonomic shape.

14. The computer mouse of claim 1, wherein the button module is flexibly connected to the case module by a cable.

* * * * *